（12) United States Patent
Rodriguez et al.

(10) Patent No.: US 10,146,679 B2
(45) Date of Patent: Dec. 4, 2018

(54) ON DIE/OFF DIE MEMORY MANAGEMENT

(75) Inventors: Jose M. Rodriguez, San Jose, CA (US); Animesh Mishra, Pleasanton, CA (US); Naveen Doddapuneni, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 208 days.

(21) Appl. No.: 13/995,012

(22) PCT Filed: Dec. 30, 2011

(86) PCT No.: PCT/US2011/068005
§ 371 (c)(1),
(2), (4) Date: Oct. 11, 2013

(87) PCT Pub. No.: WO2013/101137
PCT Pub. Date: Jul. 4, 2013

(65) Prior Publication Data
US 2014/0040570 A1  Feb. 6, 2014

(51) Int. Cl.
*G06F 12/00* (2006.01)
*G06F 13/38* (2006.01)
(52) U.S. Cl.
CPC ............ *G06F 12/00* (2013.01); *G06F 13/387* (2013.01)
(58) Field of Classification Search
None
See application file for complete search history.

(56) References Cited

U.S. PATENT DOCUMENTS

| 5,379,356 | A | 1/1995 | Purcell et al. | |
| 5,805,236 | A * | 9/1998 | Roth | H04N 1/00283 |
| | | | | 327/407 |
| 7,154,550 | B1 * | 12/2006 | Kaku | H04N 1/0044 |
| | | | | 348/207.99 |
| 7,580,402 | B2 | 8/2009 | Masuhiro et al. | |
| 7,587,566 | B2 | 9/2009 | Ballantyne | |
| 8,380,959 | B2 | 2/2013 | Lindahl | |
| 2004/0183805 | A1 | 9/2004 | Kim | |
| 2005/0157172 | A1 * | 7/2005 | Hartley | G09G 5/363 |
| | | | | 348/186 |
| 2007/0257926 | A1 | 11/2007 | Deb | |
| 2008/0055325 | A1 | 3/2008 | Seigneret et al. | |

(Continued)

FOREIGN PATENT DOCUMENTS

| CN | 1874511 | 12/2006 |
| CN | 101137061 A | 3/2008 |

(Continued)

OTHER PUBLICATIONS

PCT International Search Report and Written Opinion issued in corresponding PCT/US2011/068005 dated Jun. 21, 2012 (9 pages).

(Continued)

*Primary Examiner* — Nicholas R Wilson
(74) *Attorney, Agent, or Firm* — Trop Pruner & Hu, P.C.

(57) ABSTRACT

Video analytics may be used to assist video encoding by selectively encoding only portions of a frame and using, instead, previously encoded portions. Previously encoded portions may be used when succeeding frames have a level of motion less than a threshold. In such case, all or part of succeeding frames may not be encoded, increasing bandwidth and speed in some embodiments.

30 Claims, 11 Drawing Sheets

(56) References Cited

U.S. PATENT DOCUMENTS

| | | | |
|---|---|---|---|
| 2008/0130743 A1 | 6/2008 | Kosuge | |
| 2010/0039562 A1* | 2/2010 | Yang | G06F 3/1423 |
| | | | 348/655 |
| 2010/0076944 A1 | 3/2010 | Kamat | |
| 2010/0166076 A1* | 7/2010 | Endresen | H04N 19/176 |
| | | | 375/240.18 |
| 2012/0274856 A1* | 11/2012 | Kumar | G09G 5/14 |
| | | | 348/660 |

FOREIGN PATENT DOCUMENTS

| | | |
|---|---|---|
| CN | 101340580 A | 1/2009 |
| JP | 2005116128 A | 4/2005 |
| TW | 201116065 A1 | 5/2011 |
| TW | 201142826 A | 12/2011 |

OTHER PUBLICATIONS

TW Search Report issued in corresponding TW101150122 dated May 21, 2015 [w/English translation] (2 pages).
TW Office Action issued in corresponding TW101150122 dated May 21, 2015 [w/English translation] (7 pages).
Taiwan office action issued in corresponding TW 104139431 dated Oct. 14, 2016 (9 pages).
Taiwan search report issued in corresponding TW 104139431 dated Oct. 14, 2016 (2 pages).
CN 2nd office action in corresponding CN application No. 201180076148.8 dated May 2, 2017 (6 pages).
CN office action in corresponding CN application No. 201180076148.8 dated Oct. 9, 2016 (10 pages). [no English translation].

* cited by examiner

ON DIE/OFF DIE MEMORY MANAGEMENT

BACKGROUND

This relates generally to computers and, particularly, to video processing.

There are a number of applications in which video must be processed and/or stored. One example is video surveillance, wherein one or more video feeds may be received, analyzed, and processed for security or other purposes. Another conventional application is for video conferencing.

Typically, general purpose processors, such as central processing units, are used for video processing. In some cases, a specialty processor, called a graphics processor, may assist the central processing unit.

Video analytics involves obtaining information about the content of video information. For example, the video processing may include content analysis, wherein the content video is analyzed in order to detect certain events or occurrences or to find information of interest.

DETAILED DESCRIPTION

In accordance with some embodiments, a memory controller for a video analytics engine may facilitate memory operations by automatically accessing either an entire matrix within a main memory or any storage location within a main memory. In some embodiments, the main memory may store a two-dimensional (2D) representation that enables the memory controller to randomly access any location (including one pixel) within the memory matrix.

In some embodiments, the internal memory may be represented as a 2D memory matrix and the external memory may be a conventional linear memory. Data stored in the linear memory may then be converted to a two-dimensional format for use within a video analytics engine.

Figure 1:
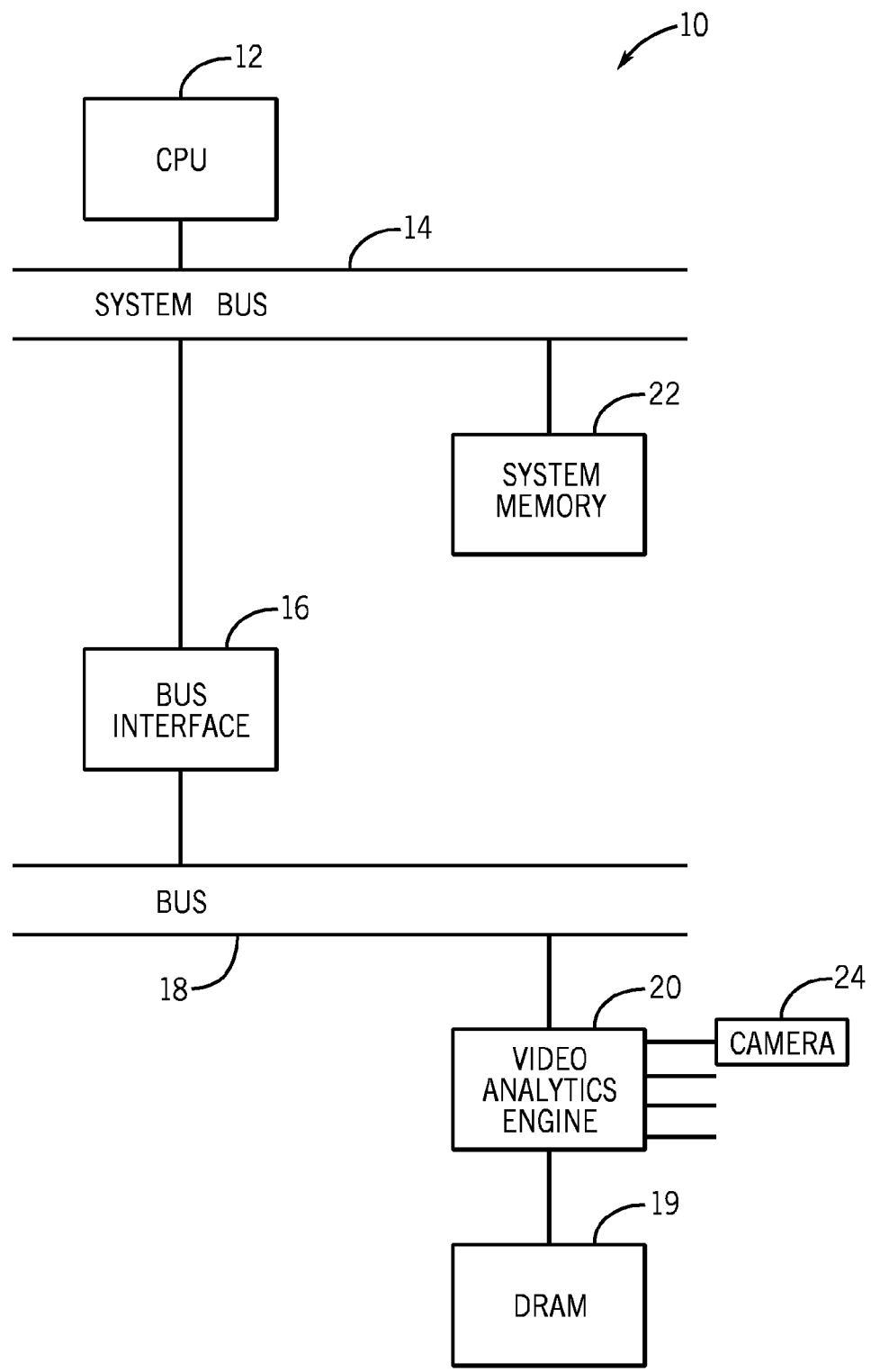
FIG. 1 is a system architecture in accordance with one embodiment of the present invention.

Referring to FIG. 1, a computer system 10 may be any of a variety of computer systems, including those that use video analytics, such as video surveillance and video conferencing application, as well as embodiments which do not use video analytics. The system 10 may be a desk top computer, a server, a laptop computer, a mobile Internet device, or a cellular telephone, to mention a few examples.

The system 10 may have one or more host central processing units 12, coupled to a system bus 14. A system memory 22 may be coupled to the system bus 14. While an example of a host system architecture is provided, the present invention is in no way limited to any particular system architecture.

The system bus 14 may be coupled to a bus interface 16, in turn, coupled to a conventional bus 18. In one embodiment, the Peripheral Component Interconnect Express (PCIe) bus may be used, but the present invention is in no way limited to any particular bus.

A video analytics engine 20 may be coupled to the host via a bus 18. In one embodiment, the video analytics engine may be a single integrated circuit which provides both encoding and video analytics. In one embodiment, the integrated circuit may use embedded Dynamic Random Access Memory (EDRAM) technology. However, in some embodiments, either encoding or video analytics may be dispensed with. In addition, in some embodiments, the engine 20 may include a memory controller that controls an on-board integrated two dimensional matrix memory, as well as providing communications with an external memory.

Thus, in the embodiment illustrated in FIG. 1, the video analytics engine 20 communicates with a local dynamic random access memory (DRAM) 19. Specifically, the video analytics engine 20 may include a memory controller for accessing the memory 19. Alternatively, the engine 20 may use the system memory 22 and may include a direct connection to system memory.

Also coupled to the video analytics engine 20 may be one or more cameras 24. In some embodiments, up to four simultaneous video inputs may be received in standard definition format. In some embodiments, one high definition input may be provided on three inputs and one standard definition may be provided on the fourth input. In other embodiments, more or less high definition inputs may be provided and more or less standard definition inputs may be provided. As one example, each of three inputs may receive ten bits of high definition input data, such as R, G and B inputs or Y, U and V inputs, each on a separate ten bit input line.

Figure 2:
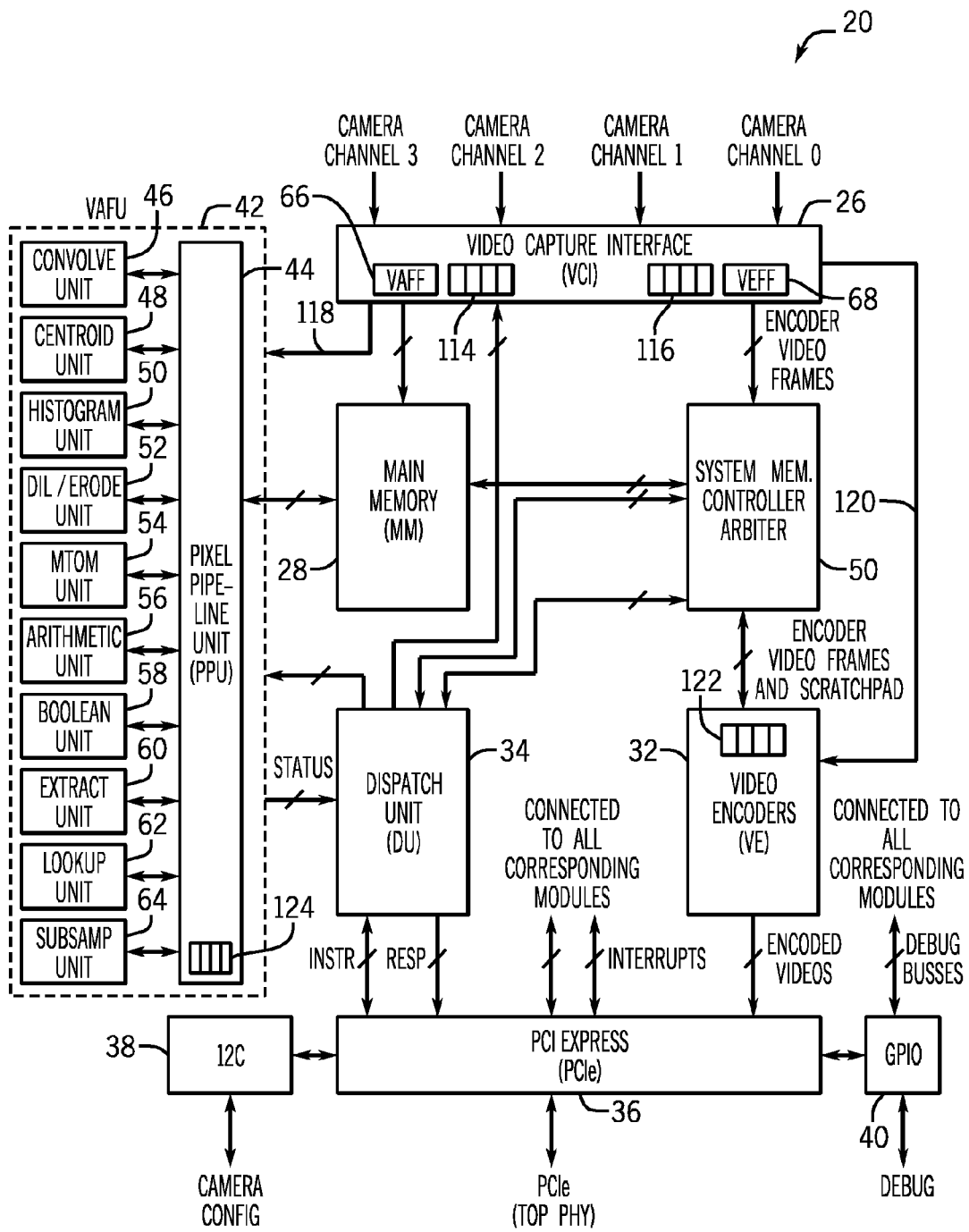
FIG. 2 is a circuit depiction for the video analytics engine shown in FIG. 1 in accordance with one embodiment.

One embodiment of the video analytics engine 20, shown in FIG. 2, is depicted in an embodiment with four camera channel inputs at the top of the page. The four inputs may be received by a video capture interface 26. The video capture interface 26 may receive multiple simultaneous video inputs in the form of camera inputs or other video information, including television, digital video recorder, or media player inputs, to mention a few examples.

The video capture interface automatically captures and copies each input frame. One copy of the input frame is provided to the VAFF unit 66 and the other copy may be provided to VEFF unit 68. The VEFF unit 68 is responsible for storing the video on the external memory, such as the memory 22, shown in FIG. 1. The external memory may be coupled to an on-chip system memory controller/arbiter 50 in one embodiment. In some embodiments, the storage on the external memory may be for purposes of video encoding. Specifically, if one copy is stored on the external memory, it can be accessed by the video encoders 32 for encoding the information in a desired format. In some embodiments, a plurality of formats are available and the system may select a particular encoding format that is most desirable.

As described above, in some cases, video analytics may be utilized to improve the efficiency of the encoding process implemented by the video encoders 32. Once the frames are encoded, they may be provided via the PCI Express bus 36 to the host system.

At the same time, the other copies of the input video frames are stored on the two dimensional matrix or main memory 28. The VAFF may process and transmit all four input video channels at the same time. The VAFF may include four replicated units to process and transmit the video. The transmission of video for the memory 28 may use multiplexing. Due to the delay inherent in the video retrace time, the transfers of multiple channels can be done in real time, in some embodiments.

Storage on the main memory may be selectively implemented non-linearly or linearly. In conventional, linear addressing one or more locations on intersecting addressed lines are specified to access the memory locations. In some cases, an addressed line, such as a word or bitline, may be specified and an extent along that word or bitline may be indicated so that a portion of an addressed memory line may be successively stored in automated fashion.

In contrast, in two dimensional or non-linear addressing, both row and column lines may be accessed in one operation. The operation may specify an initial point within the memory matrix, for example, at an intersection of two addressed lines, such as row or column lines. Then a memory size or other delimiter is provided to indicate the extent of the matrix in two dimensions, for example, along row and column lines. Once the initial point is specified, the entire matrix may be automatically stored by automated incrementing of addressable locations. In other words, it is not necessary to go back to the host or other devices to determine addresses for storing subsequent portions of the memory matrix, after the initial point. The two dimensional memory offloads the task of generating addresses or substantially entirely eliminates it. As a result, in some embodiments, both required bandwidth and access time may be reduced.

Basically the same operation may be done in reverse to read a two dimensional memory matrix. Alternatively, a two dimensional memory matrix may be accessed using conventional linear addressing as well.

While an example is given wherein the size of the memory matrix is specified, other delimiters may be provided as well, including an extent in each of two dimensions (i.e. along word and bitlines). The two dimensional memory is advantageous with still and moving pictures, graphs, and other applications with data in two dimensions.

Information can be stored in the memory 28 in two dimensions or in one dimension. Conversion between one and two dimensions can occur automatically on the fly in hardware, in one embodiment.

In some embodiments, video encoding of multiple streams may be undertaken in a video encoder at the same time the multiple streams are also being subjected to analytics in the video analytics functional unit 42. This may be implemented by making a copy of each of the streams in the video capture interface 26 and sending one set of copies of each of the streams to the video encoders 32, while another copy goes to the video analytics functional unit 42.

In one embodiment, a time multiplexing of each of the plurality of streams may be undertaken in each of the video encoders 32 and the video analytics functional unit 42. For example, based on user input, one or more frames from the first stream may be encoded, followed by one or more frames from the second stream, followed by one or more streams from the next stream, and so on. Similarly, time multiplexing may be used in the video analytics functional unit 42 in the same way wherein, based on user inputs, one or more frames from one stream are subjected to video analytics, then one or more frames from the next stream, and so on. Thus, a series of streams can be processed at substantially the same time, that is, in one shot, in the encoders and video analytics functional unit.

In some embodiments, the user can set the sequence of which stream is processed first and how many frames of each stream are processed at any particular time. In the case of the video encoders and the video analytics engine, as the frames are processed, they can be output over the bus 36.

The context of each stream in the encoder may be retained in a register dedicated to that stream in the register set 122, which may include registers for each of the streams. The register set 122 may record the characteristics of the encoding which have been specified in one of a variety of ways, including a user input. For example, the resolution, compression rate, and the type of encoding that is desired for each stream can be recorded. Then, as the time multiplexed encoding occurs, the video encoder can access the correct characteristics for the current stream being processed from the register 116, for the correct stream.

Similarly, the same thing can be done in the video analytics functional unit 46 using the register set 124. In other words, the characteristics of the video analytics processing or the encoding per stream can be recorded within the registers 124 and 122 with one register reserved for each stream in each set of registers.

In addition, the user or some other source can direct that the characteristics be changed on the fly. By "on the fly," it is intended to refer to a change that occurs during analytics processing, in the case of the video analytics functional unit 42 or in the case of encoding, in the case of the video encoders 32.

When a change comes in when a frame is being processed, the change may be initially recorded in shadow registers 116, for the video encoders and shadow registers 114, for the video analytics functional unit 42. Then, as soon as the frame (or designated number of frames) is completed, the video encoder 32 checks to see if any changes have been stored in the registers 116. If so, the video encoder transfers those changes over the path 120 to the registers 122, updating the new characteristics in the registers appropriate for each stream that had its encoding characteristics changed on the fly.

Again, the same on the fly changes may be done in the video analytics functional unit 42, in one embodiment. When an on the fly change is detected, the existing frames (or an existing set of work) may be completed using the old characteristics, while storing the changes in the shadow registers 114. Then at an opportune time, after a workload or frame has completed processing, the changes may be transferred from the registers 114 over the bus 118 to the video analytics functional unit 42 for storage in the registers 124, normally replacing the characteristics stored for any particular stream in separate registers among the registers 124. Then, once the update is complete, the next processing load uses the new characteristics.

Figure 6:
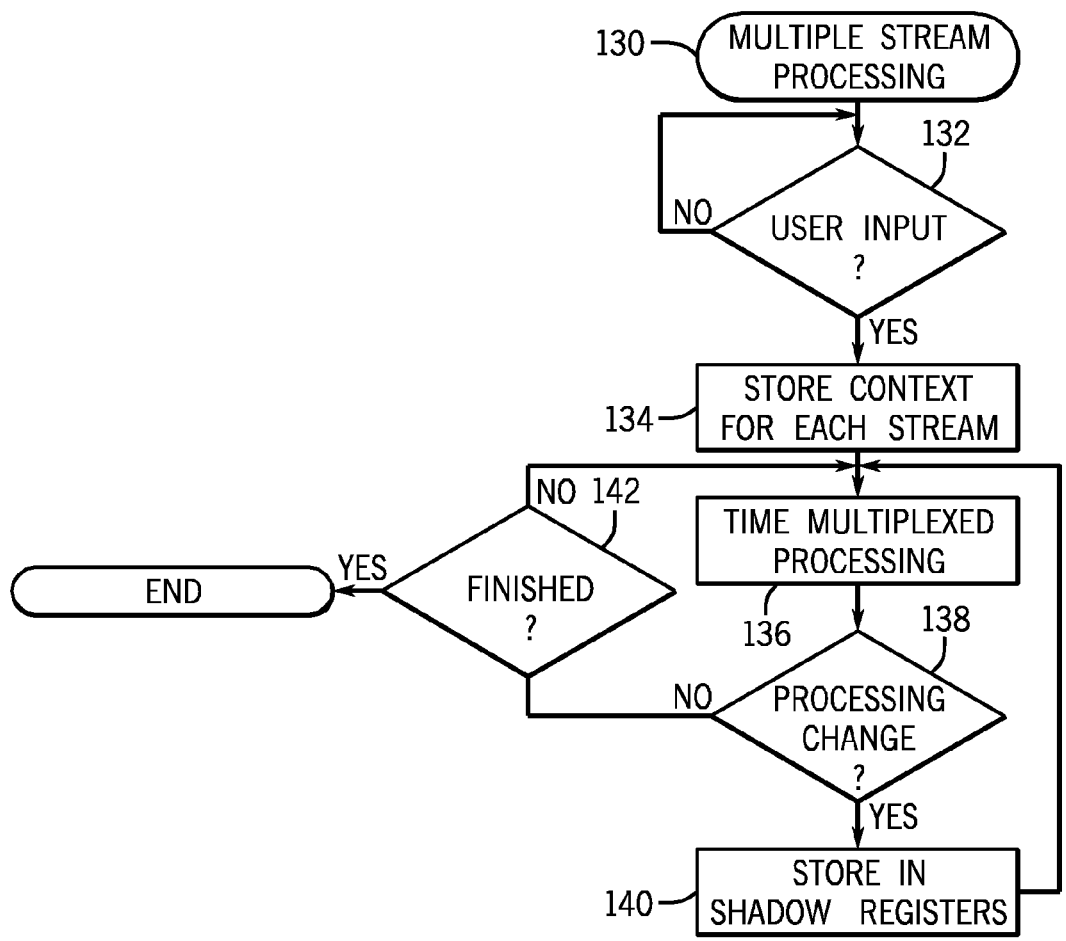
FIG. 6 is a flow chart for another embodiment.

Thus, referring to FIG. 6, the sequence 130 may be implemented in software, firmware, and/or hardware. In software or firmware based embodiments, the sequence may be implemented by computer executed instructions stored in a non-transitory computer readable medium, such as an optical, magnetic, or semiconductor memory. For example, in the case of the encoder 32, the sequence may be stored in a memory within the encoder and, in the case of the analytics functional unit, they may be stored, for example in the pixel pipeline unit 44, in one embodiment.

Initially, the sequence waits for user input of context instructions for encoding or analytics. The flow may be the same, in some embodiments, for analytics and encoding. Once the user input is received, as determined in diamond 132, the context is stored for each stream in an appropriate register 122 or 124, as indicated in block 134. Then the time multiplexed processing begins, as indicated in block 136. During that processing, a check at diamond 138 determines whether there has been any processing change instructions. If not, a check at diamond 142 determines whether the processing is completed. If not, the time multiplexed processing continues.

If a processing change has been received, it may be stored in the appropriate shadow registers 114 or 116, as indicated in block 140. Then, when a current processing task is completed, the change can be automatically implemented in the next set of operations, be it encoding, in the case of video encoders 32 or analytics, in the case of functional unit 42.

In some embodiments, the frequency of encoding may change with the magnitude of the load on the encoder. Generally, the encoder runs fast enough that it can complete encoding of one frame before the next frame is read out of the memory. In many cases, the encoding engine may be run at a faster speed than needed to encode one frame or set of frames before the next frame or set of frames has run out of memory.

The context registers may store any necessary criteria for doing the encoding or analytics including, in the case of the encoder, resolution, encoding type, and rate of compression. Generally, the processing may be done in a round robin fashion proceeding from one stream or channel to the next. The encoded data is then output to the Peripheral Components Interconnect (PCI) Express bus 18, in one embodiment. In some cases, buffers associated with the PCI Express bus may receive the encoding from each channel. Namely, in some embodiments, a buffer may be provided for each video channel in association with the PCI Express bus. Each channel buffer may be emptied to the bus controlled by an arbiter associated with the PCI Express bus. In some embodiments, the way that the arbiter empties each channel to the bus may be subject to user inputs.

Figure 3:
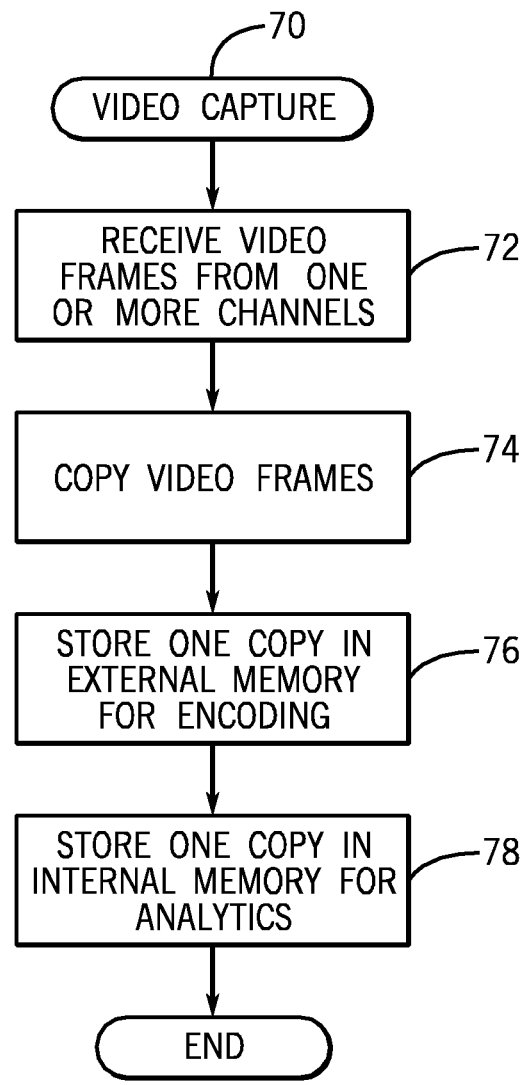
FIG. 3 is a flow chart for video capture in accordance with one embodiment of the present invention.

Thus, referring to FIG. 3, a system for video capture 20 may be implemented in hardware, software, and/or firmware. Hardware embodiments may be advantageous, in some cases, because they may be capable of greater speeds.

As indicated in block 72, the video frames may be received from one or more channels. Then the video frames are copied, as indicated in block 74. Next, one copy of the video frames is stored in the external memory for encoding, as indicated in block 76. The other copy is stored in the internal or the main memory 28 for analytics purposes, as indicated in block 78.

Figure 4:
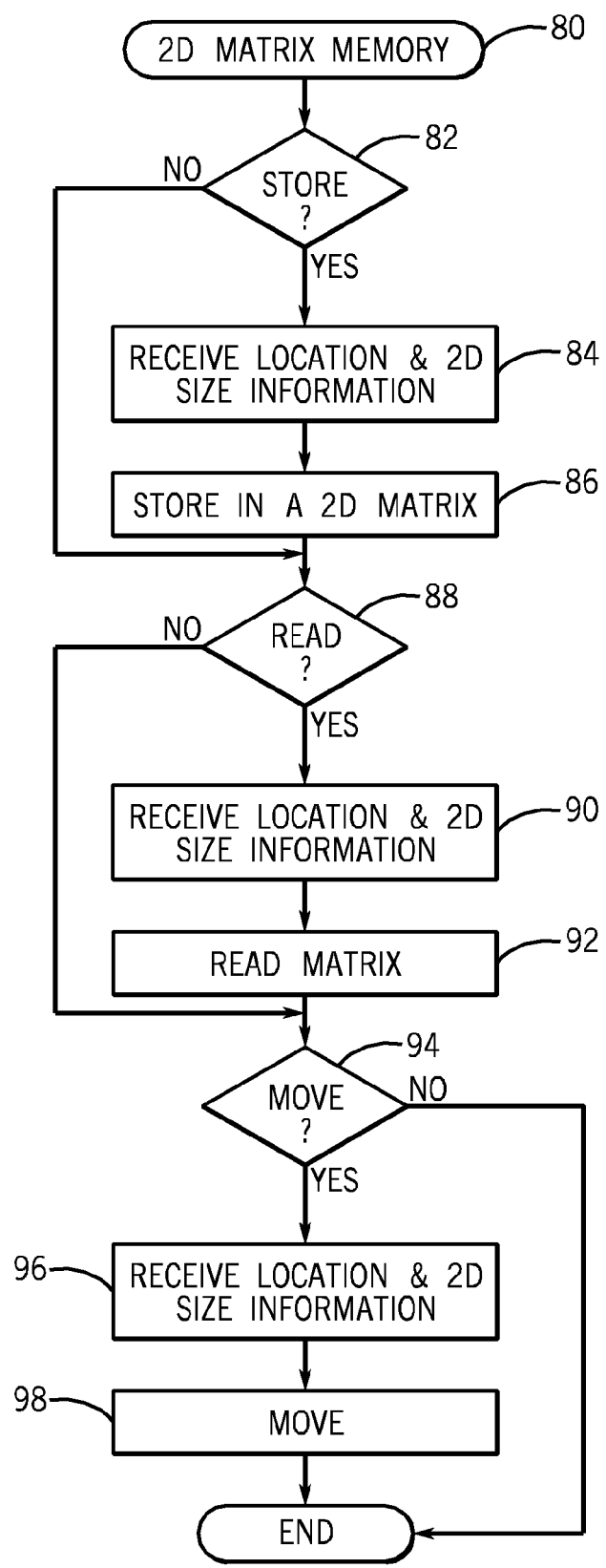
FIG. 4 is a flow chart for a two dimensional matrix memory in accordance with one embodiment.

Referring next to the two dimensional matrix sequence 80, shown in FIG. 4, a sequence may be implemented in software, firmware, or hardware. Again, there may be speed advantages in using hardware embodiments.

Initially, a check at diamond 82 determines whether a store command has been received. Conventionally, such commands may be received from the host system and, particularly, from its central processing unit 12. Those commands may be received by a dispatch unit 34, which then provides the commands to the appropriate units of the engine 20, used to implement the command. When the command has been implemented, in some embodiments, the dispatch unit reports back to the host system.

If a store command is involved, as determined in diamond 82, an initial memory location and two dimensional size information may be received, as indicated in block 84. Then the information is stored in an appropriate two dimensional matrix, as indicated in block 86. The initial location may, for example, define the upper left corner of the matrix. The store operation may automatically find a matrix within the memory 20 of the needed size in order to implement the operation. Once the initial point in the memory is provided, the operation may automatically store the succeeding parts of the matrix without requiring additional address computations, in some embodiments.

Conversely, if a read access is involved, as determined in diamond 88, the initial location and two dimensional size information is received, as indicated in block 90. Then the designated matrix is read, as indicated in block 92. Again, the access may be done in automated fashion, wherein the initial point may be accessed, as would be done in conventional linear addressing, and then the rest of the addresses are automatically determined without having to go back and compute addresses in the conventional fashion.

Finally, if a move command has been received from the host, as determined in block 94, the initial location and two dimensional size information is received, as indicated in block 96, and the move command is automatically implemented, as indicated in block 98. Again, the matrix of information may be automatically moved from one location to another, simply by specifying a starting location and providing size information.

Referring back to FIG. 2, the video analytics unit 42 may be coupled to the rest of the system through a pixel pipeline unit 44. The unit 44 may include a state machine that executes commands from the dispatch unit 34. Typically, these commands originate at the host and are implemented by the dispatch unit. A variety of different analytics units may be included based on application. In one embodiment, a convolve unit 46 may be included for automated provision of convolutions.

The convolve command may include both a command and arguments specifying a mask, reference or kernel so that a feature in one captured image can be compared to a reference two dimensional image in the memory 28. The command may include a destination specifying where to store the convolve result.

In some cases, each of the video analytics units may be a hardware accelerator. By "hardware accelerator," it is intended to refer to a hardware device that performs a function faster than software running on a central processing unit.

In one embodiment, each of the video analytics units may be a state machine that is executed by specialized hardware dedicated to the specific function of that unit. As a result, the units may execute in a relatively fast way. Moreover, only one clock cycle may be needed for each operation implemented by a video analytics unit because all that is necessary is to tell the hardware accelerator to perform the task and to provide the arguments for the task and then the sequence of operations may be implemented, without further control from any processor, including the host processor.

Other video analytics units, in some embodiments, may include a centroid unit 48 that calculates centroids in an automated fashion, a histogram unit 50 that determines histograms in automated fashion, and a dilate/erode unit 52.

The dilate/erode unit 52 may be responsible for either increasing or decreasing the resolution of a given image in automated fashion. Of course, it is not possible to increase the resolution unless the information is already available, but, in some cases, a frame received at a higher resolution may be processed at a lower resolution. As a result, the frame may be available in higher resolution and may be transformed to a higher resolution by the dilate/erode unit 52.

The Memory Transfer of Matrix (MTOM) unit 54 is responsible for implementing move instructions, as described previously. In some embodiments, an arithmetic unit 56 and a Boolean unit 58 may be provided. Even though these same units may be available in connection with a central processing unit or an already existent coprocessor, it may be advantageous to have them onboard the engine 20, since their presence on-chip may reduce the need for numerous data transfer operations from the engine 20 to the host and back. Moreover, by having them onboard the engine 20, the two dimensional or matrix main memory may be used in some embodiments.

An extract unit 60 may be provided to take vectors from an image. A lookup unit 62 may be used to lookup particular types of information to see if it is already stored. For example, the lookup unit may be used to find a histogram already stored. Finally, the subsample unit 64 is used when the image has too high a resolution for a particular task. The image may be subsampled to reduce its resolution.

In some embodiments, other components may also be provided including an $I_2C$ interface 38 to interface with camera configuration commands and a general purpose input/output device 40 connected to all the corresponding modules to receive general inputs and outputs and for use in connection with debugging, in some embodiments.

Figure 5:
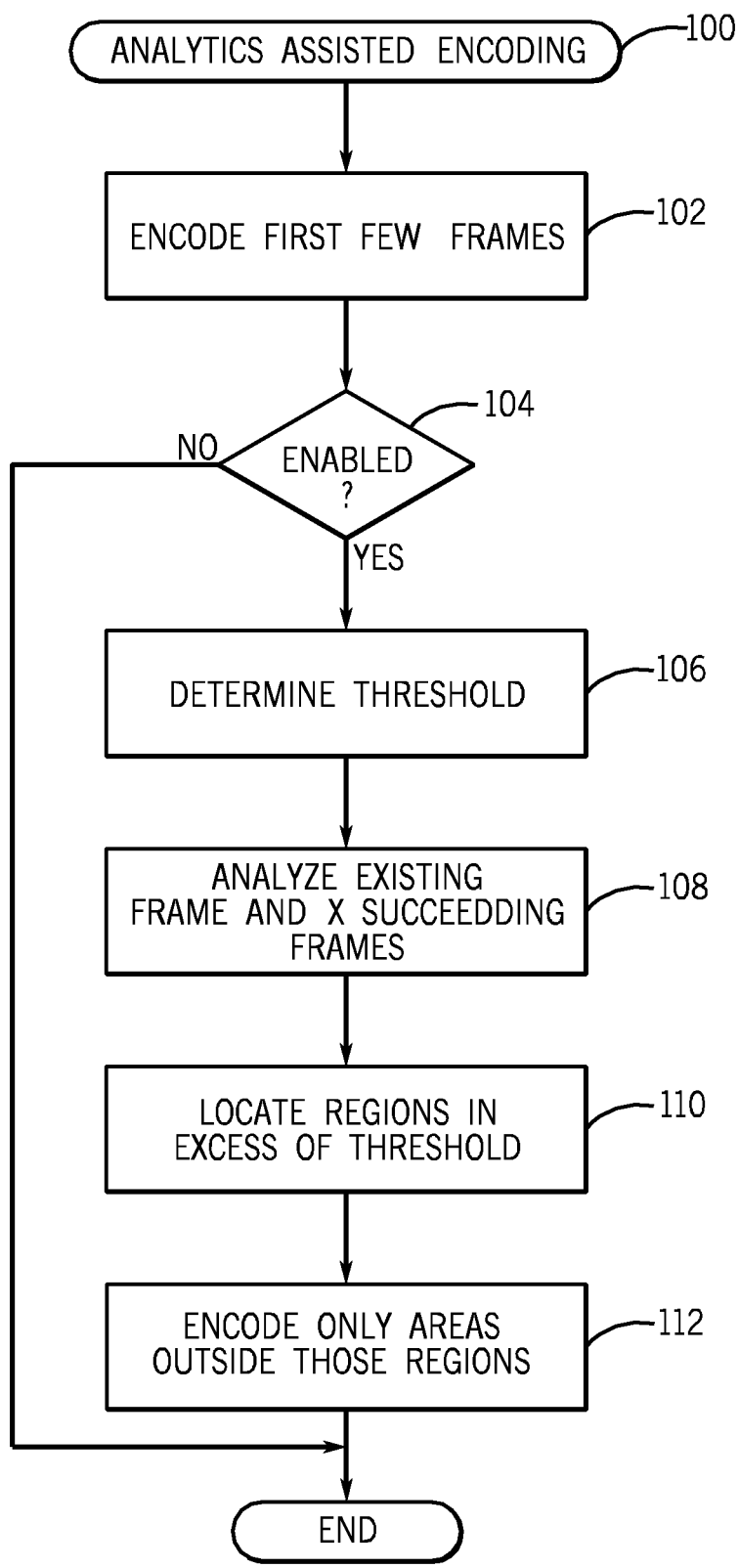
FIG. 5 is a flow chart for analytics assisted encoding in accordance with one embodiment.

Finally, referring to FIG. 5, an analytics assisted encoding scheme 100 may be implemented, in some embodiments. The scheme may be implemented in software, firmware and/or hardware. However, hardware embodiments may be faster. The analytics assisted encoding may use analytics capabilities to determine what portions of a given frame of video information, if any, should be encoded. As a result, some portions or frames may not need to be encoded in some embodiments and, as one result, speed and bandwidth may be increased.

In some embodiments, what is or is not encoded may be case specific and may be determined on the fly, for example, based on available battery power, user selections, and available bandwidth, to mention a few examples. More particularly, image or frame analysis may be done on existing frames versus ensuing frames to determine whether or not the entire frame needs to be encoded or whether only portions of the frame need to be encoded. This analytics assisted encoding is in contrast to conventional motion estimation based encoding which merely decides whether or not to include motion vectors, but still encodes each and every frame.

In some embodiments of the present invention, successive frames are either encoded or not encoded on a selective basis and selected regions within a frame, based on the extent of motion within those regions, may or may not be encoded at all. Then, the decoding system is told how many frames were or were not encoded and can simply replicate frames as needed.

Referring to FIG. 5, a first frame or frames may be fully encoded at the beginning, as indicated in block 102, in order to determine a base or reference. Then, a check at diamond 104 determines whether analytics assisted encoding should be provided. If analytics assisted encoding will not be used, the encoding proceeds as is done conventionally.

If analytics assisted encoding is provided, as determined in diamond 104, a threshold is determined, as indicated in block 106. The threshold may be fixed or may be adaptive, depending on non-motion factors such as the available battery power, the available bandwidth, or user selections, to mention a few examples. Next, in block 108, the existing frame and succeeding frames are analyzed to determine whether motion in excess of the threshold is present and, if so, whether it can be isolated to particular regions. To this end, the various analytics units may be utilized, including, but not limited to, the convolve unit, the erode/dilate unit, the subsample unit, and the lookup unit. Particularly, the image or frame may be analyzed for motion above a threshold, analyzed relative to previous and/or subsequent frames.

Then, as indicated in block 110, regions with motion in excess of a threshold may be located. Only those regions may be encoded, in one embodiment, as indicated in block 112. In some cases, no regions on a given frame may be encoded at all and this result may simply be recorded so that the frame can be simply replicated during decoding. In general, the encoder provides information in a header or other location about what frames were encoded and whether frames have only portions that are encoded. The address of the encoded portion may be provided in the form of an initial point and a matrix size in some embodiments.

In accordance with some embodiments, the memory controller 50 is able to automatically locate either an entire matrix within the main memory 28 or may access any pixel within a 2D representation stored within the main memory matrix. In some embodiments the memory controller is specifically designed to work with video storage as opposed to general storage. In some embodiments, the memory controller can access a full frame or one pixel. To access a full frame, all that is needed is a starting point of the frame and the frame size. Then all addresses are calculated internally within the memory controller 50.

The matrix can then be broken into macroblocks that may be for example of 8×8 or 16×16 sizes. The matrix itself, defined by the controller, may be of any desired size.

This two-dimensional arrangement and the use of the memory controller to access matrices within the main memory can have many advantages in some embodiments. As one example of the advantages, a screen may be entirely one color. Instead of processing the entire screen, one 8×8 macroblock at a time may be processed and a histogram may be developed to determine whether each 8×8 macroblock is all of the same color. If so, then all that is needed is to analyze any one 8×8 macroblock and the whole frame is effectively analyzed.

Thus, in some embodiments, the matrix may be of any size, the pixel may be of any size including 8, 16, 24, 32 bits and the matrices may be two-dimensional matrices. While memories are always linear, linear addresses are converted by the memory controller into two-dimensional addresses.

Figure 7:
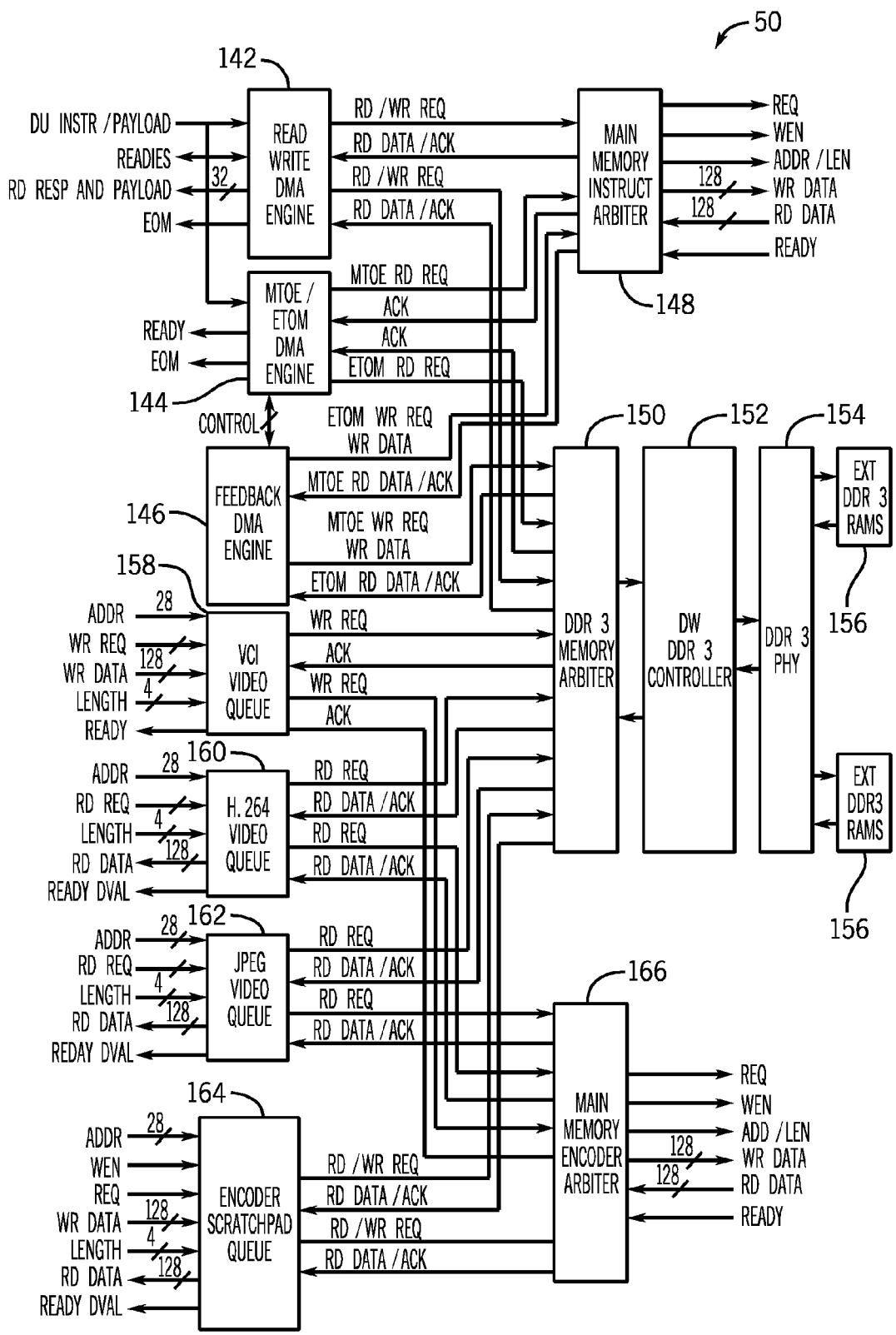
FIG. 7 is a depiction of the memory controller shown in FIG. 2 in accordance with one embodiment.

Referring to FIG. 7, a more detailed depiction of the memory controller 50 is provided. The external memories 156 may be double data rate (DDR) random access memories 156 and are not two-dimensional memories but instead are conventional linear memories in some embodiments.

Thus, two-dimensional data may be converted into linear data for storage in the external memories 156 and conversely, linear data from the external memories 156 may be converted to two-dimensional data for use within the memory controller 50.

The external random access memories 156 are connected by an analog physical or PHY 154 to the external memory controller 152. The external memory controller 152 connects to an external memory arbiter 150.

The arbiter 150 connects to a read write direct memory access (DMA) engine 142. Engine 142 provides a direct path to either the internal memory 28 (FIG. 2) or the external memory 156 from the PCI Express bus 36 (FIG. 2). The direct memory access engine 144 provides for main memory to external memory (MTOE) conversions which means it provides 2D to linear conversions, and external memory to main memory (ETOM) conversions. The feedback direct memory access (DMA) engine 146 works with the DMA engine 144. Engine 144 generates controls and requests of the engine 146, looks at the data from the engine 146 and signals at the precise time when the required data has been transferred and then requests the engine 146 to cancel the pending request. The engines 142, 144, and 146 connect to the main memory instruction arbiter 148 that in turn connects to the main memory 28 shown in FIG. 2.

A plurality of encoders 158, 160, 162 and 164 may work with the main memory encoder arbiter 166 and the external memory arbiter 150. The VCI video queue 158 is an agent that writes video into the internal or main memory 28. The H.264 video compression format video queue 160 in one embodiment is an agent for compressing and fetches video data from either memory and reads and writes that data using the encoder scratch pad queue 164. See H.264 (MPEG-4) Advanced Video Coding Specification available from International Telecommunications Union (ITU)) June 2011. The queue 164 enables the H.264 video queue to both read and write. However, the JPEG image compression format video queue 162 is an agent that fetches from either memory but only reads and never writes data. See JPEG Standard T.81 available from the International Telecommunications Union (ITU) September 1992. Different compression standards may be used in some embodiments.

As a result, both the VCI and the encoders can operate from either the main memory or the external memory. When executing from two-dimensional main memories, during encoding, the main memory encoder arbiter 166 does all the conversions without using the engines 144 and 146. Thus, more direct conversions may be implemented by the arbiter 166 during video encoding. The arbiter 166 fetches the data and converts it to linear form and gives it to the queue 160 in one embodiment.

Figure 8:
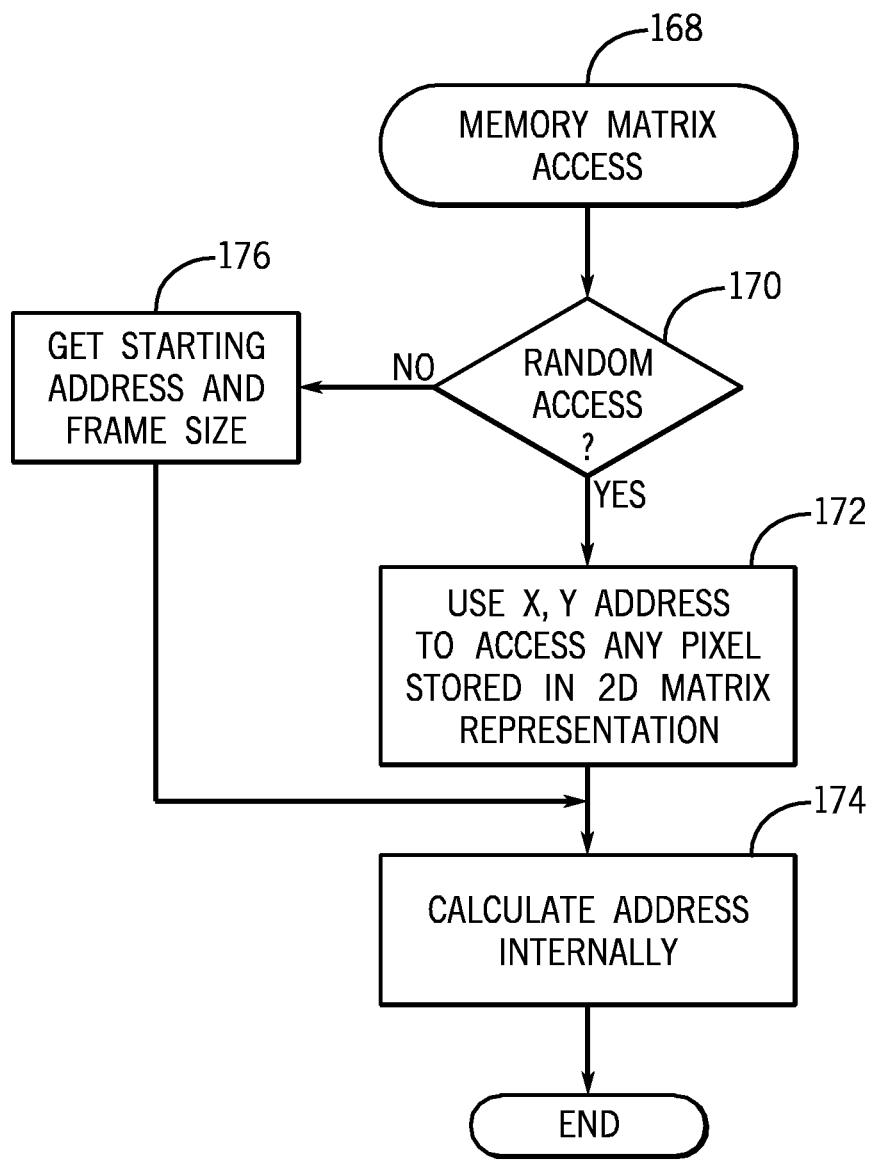
FIG. 8 is a flow chart for the memory controller in accordance with one embodiment.

Referring to FIG. 8, a sequence 168 for memory matrix accesses in the memory controller 150 may be implemented in software, hardware and/or firmware. In software and firmware embodiments it may be implemented by computer executed instructions stored in the non-transitory computer readable medium such as a magnetic, optical, or semiconductor memory.

The sequence begins at diamond 170 by determining whether a random access memory request is involved. If so, the X and Y addresses are used to access any pixels stored in a two-dimensional matrix representation as indicated in block 172. Then the memory controller itself internally calculates the addresses for the access locations as indicated in block 174.

On the other hand, if a random access is not involved, the starting address and frame site is obtained (block 176) by the memory controller 50 and this information is sufficient to specify a matrix within the main memory. And the addresses are internally calculated as indicated in block 174.

Figure 9:
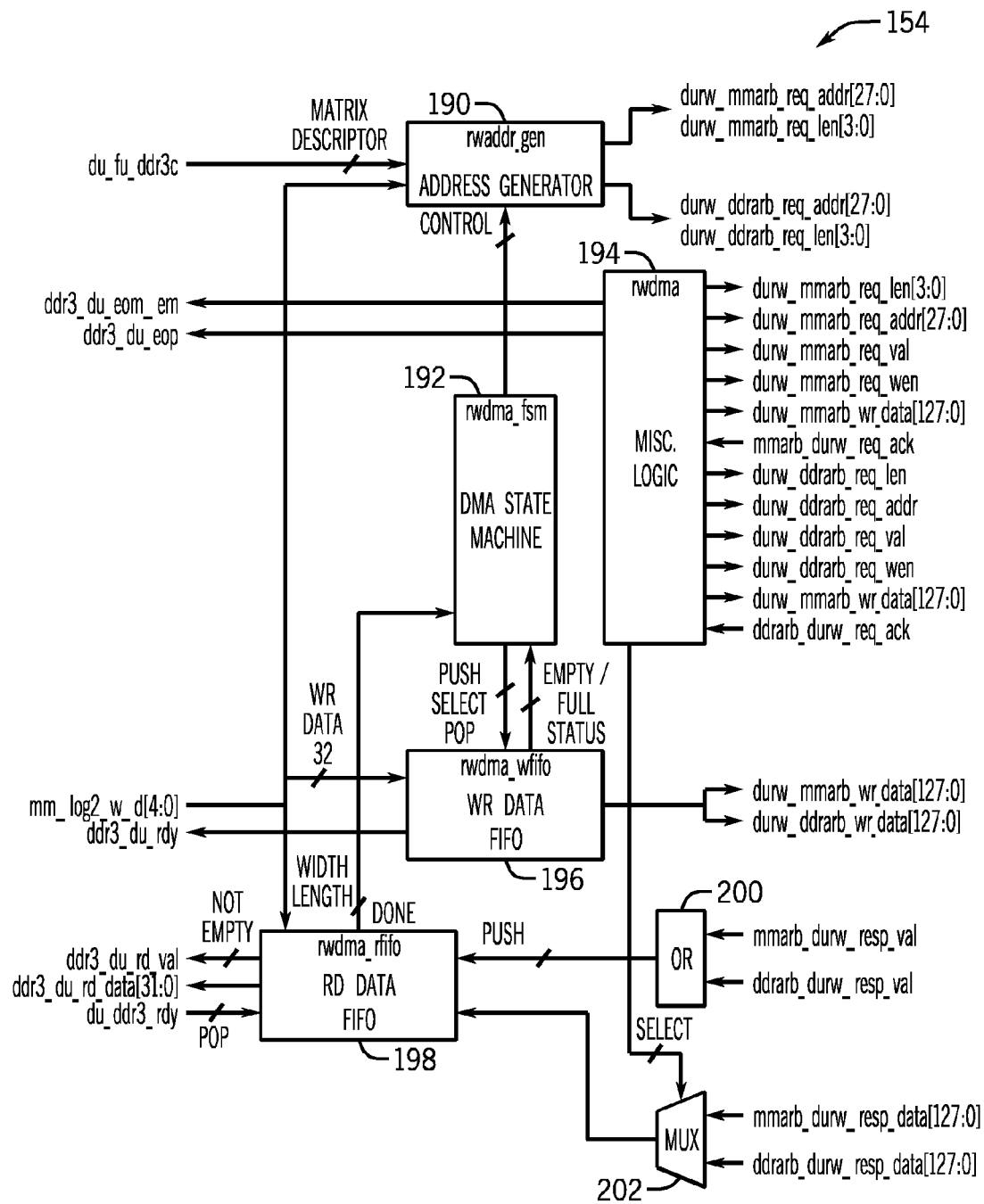
FIG. 9 is a schematic depiction of the MTOE/ETOM DMA engine shown in FIG. 7 according to one embodiment.

Referring to FIG. 9, a more detailed depiction of the engine 144 is depicted. An address generator 190 generates the addresses for the external memory. A direct memory access (DMA) state machine 192 provides control signals for the address generator 190. A write data first in, first out (FIFO) 196 provides empty/full status signals to the machine 192 and receives push, select and pop commands from the engine 192. It stores data to be written (Wr DATA) and outputs write data to the external memory.

A read data FIFO 198 provides width, length and done signals to the machine 192. It receives a selection from OR logic 200 and a selection of a multiplexer 202. The multiplexer 202 is selected by a logic unit 194. The read data FIFO outputs read values for the external memory and receives a pop value from the external memory.

To transfer video data between the main memory 28 and the external memory the MTOE and ETOM instructions are used. The DMA apparatus shown in FIG. 9, is used to achieve the transfer video data. In the MTOE operation, the video matrix data is read and the two-dimensional matrix format is transferred to external memory. In the ETOM operation, the video matrix data is read from the external memory in the linear format and transferred to the main memory. The DMA engines may achieve high throughput on both memory subsystems in some embodiments to achieve real time video analytics operations.

Video analytics and video coding functions require significant amounts of memory to store multiple video frames, as well as raw unprocessed video while requiring extremely high bandwidth accesses to support real time video analytics and video encoding. This is where the external DRAM and internal main memory come into play. The external memory may include a 32-bit wide interface using very high bandwidth to sustain real time high definition video encoding and high definition video analytics. The external memory subsystem supports two different methods for logic address to physical address mapping.

In the Row Bank Control (RBC) mode, the logical address is mapped as follows. The logical address is equal to most significant bits of the row address, bank address, column address and then the least significant bits of those addresses. Sequential addressing sequences through an entire external memory page. A page is a bank/row partition. Then the addressing jumps to the next external bank and reads an entire page, and so on. This may be used on the three channels used for standard definition video.

For example, starting at address zero and counting up, all of the words of the page designated as bank zero/row zero one are read, then there is a jump to the page bank one/row zero, all its words are read, followed by a jump to the page bank two/row zero, and continue through the pages (banks and rows).

An external memory page may be four kilobytes in one embodiment since there are ten column bits and a thirty-two bit memory interface. So every thirty-two kilobyte (0x8000) address falls into the same external memory bank but in a different external memory page.

Opening and closing the external memory page within the same bank requires extra cycles on the interface making the data bus inefficient. Thus, it is advantageous to avoid page conflicts to reduce the latency and improve the overall external memory data bus sufficiency.

The video capture interface includes ping and pong buffers for each of the four video channels. Within these ping and pong buffers, there are three buffers allocated per video frame, one memory buffer for the luma component and two memory buffers for the chroma components or Red, Green and Blue. Color spaces other than YCrCb may also be used.

All video interfaces issue requests to fetch both luma and chroma components simultaneously. For instance, the video capture interface can write luma and chroma components of ping video buffers of all four channels simultaneously and the video encoder reads the pong video buffers during these video capture interface writes.

To avoid external memory page conflicts, all possible accesses should be four kilobytes apart but not thirty-two kilobytes apart in one embodiment. This is not possible since we have a total of 2×4×3 or 24 different memory access patterns and only eight banks. However, it is possible to minimize the page conflict by allocating the memory buffer as described in the table below where Ch stands for channel, Y stands for luma, CB stands for the chroma component Cb and CR stands for chroma component Cr.

| Memory buffer | Offset address |
|---|---|
| Ch0 Ping Y | 0x0 |
| Ch0 Ping CR | 0x1000 (4 KB) |
| Ch0 Ping CB | 0x2000 (8 KB) |
| Ch0 Pong Y | 0x3000 (12 KB) |
| Ch0 Pong CR | 0x4000 (16 KB) |
| Ch0 Pong CB | 0x5000 (20 KB) |
| Ch1 Ping Y | 0x1000 (4 KB) |
| Ch1 Ping CR | 0x2000 (8 KB) |
| Ch1 Ping CB | 0x3000 (12 KB) |
| CH1 Pong Y | 0x4000 (16 KB) |
| Ch1 Pong CR | 0x5000 (20 KB) |
| Ch1 Pong CB | 0x6000 (24 KB) |
| Ch2 Ping Y | 0x3000 (12 KB) |
| Ch2 Ping CR | 0x4000 (16 KB) |
| Ch2 Ping CB | 0x5000 (20 KB) |
| Ch2 Pong Y | 0x6000 (24 KB) |
| Ch2 Pong CR | 0x7000 (28 KB) |
| Ch2 Pong CB | 0x0000 (0 KB) |
| Ch2 Ping Y | 0x4000 (16 KB) |
| Ch2 Ping CR | 0x5000 (20 KB) |
| Ch2 Ping CB | 0x6000 (24 KB) |
| Ch2 Pong Y | 0x7000 (28 KB) |
| Ch2 Pong CR | 0x0000 (0 KB) |
| Ch2 Pong CBH | 0x1000 (4 KB) |

In the bank row control (BRC) mode the logical address is mapped as follows. The logical address equals the most significant bit, bank address, row address, column address and then the least significant bit of those addresses. In this method, sequential addressing sequences through an entire page (a bank/row partition) and then jumps to the next page of the same bank. This may be used for the high definition mode. This method should be carefully used and proper address allocation should be done for each port.

The Y, Cr and Cb components of the ping pong video buffers may be allocated in different memory banks. The scratch pad in the encoders 32 and the dispatch unit 34 (FIG. 2) may be allocated in the remaining two banks respectively. For example, ping Y, Cr and Cb components can be allocated to banks 0, 1 and 2. And pong Y, Cr and Cb components can be allocated to banks 3, 4 and 5.

For a 256-megabyte external memory, each of the these memory buffers is allocated 32-megabytes apart to keep each of them in different banks. The scratch pad can be allocated to bank 6 and the dispatchment can be allocated to bank 7. This method may reduce the overall page conflict penalty since the external memory controller 50 (FIG. 2) executes precharge and activates speculatively while access to other banks are active. Thus, in some embodiments, this method may achieve high data bus efficiency and may provide extremely high data throughput.

Figure 11:
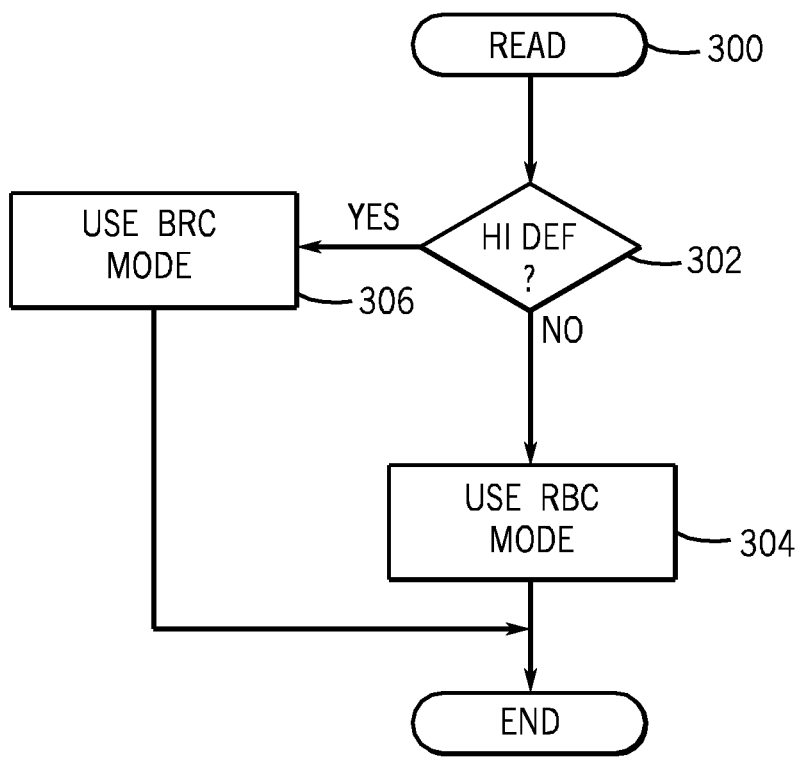
FIG. 11 is a flow chart for one embodiment.

Referring to FIG. 11, a read sequence 300 may begin by determining whether received video is in a high definition or standard definition format as indicated in diamond 302. If it is in standard definition, then the RBC mode is used for the read as indicated in block 304. Otherwise, when the video is in high definition format, the BRC mode is used as indicated in block 306. The sequence of FIG. 11, may be implemented in one example as part of the state machine 192 shown in FIG. 9.

FIGS. 3, 4, 5, 8 and 11 are flow charts which may be implemented in hardware. They may also be implemented in software or firmware, in which case they may be embodied on a non-transitory computer readable medium, such as an optical, magnetic, or semiconductor memory. The non-transitory medium stores instructions for execution by a processor. Examples of such a processor or controller may include the analytics engine 20 and suitable non-transitory media may include the main memory 28 and the external memory 22, as two examples.

Figure 10:
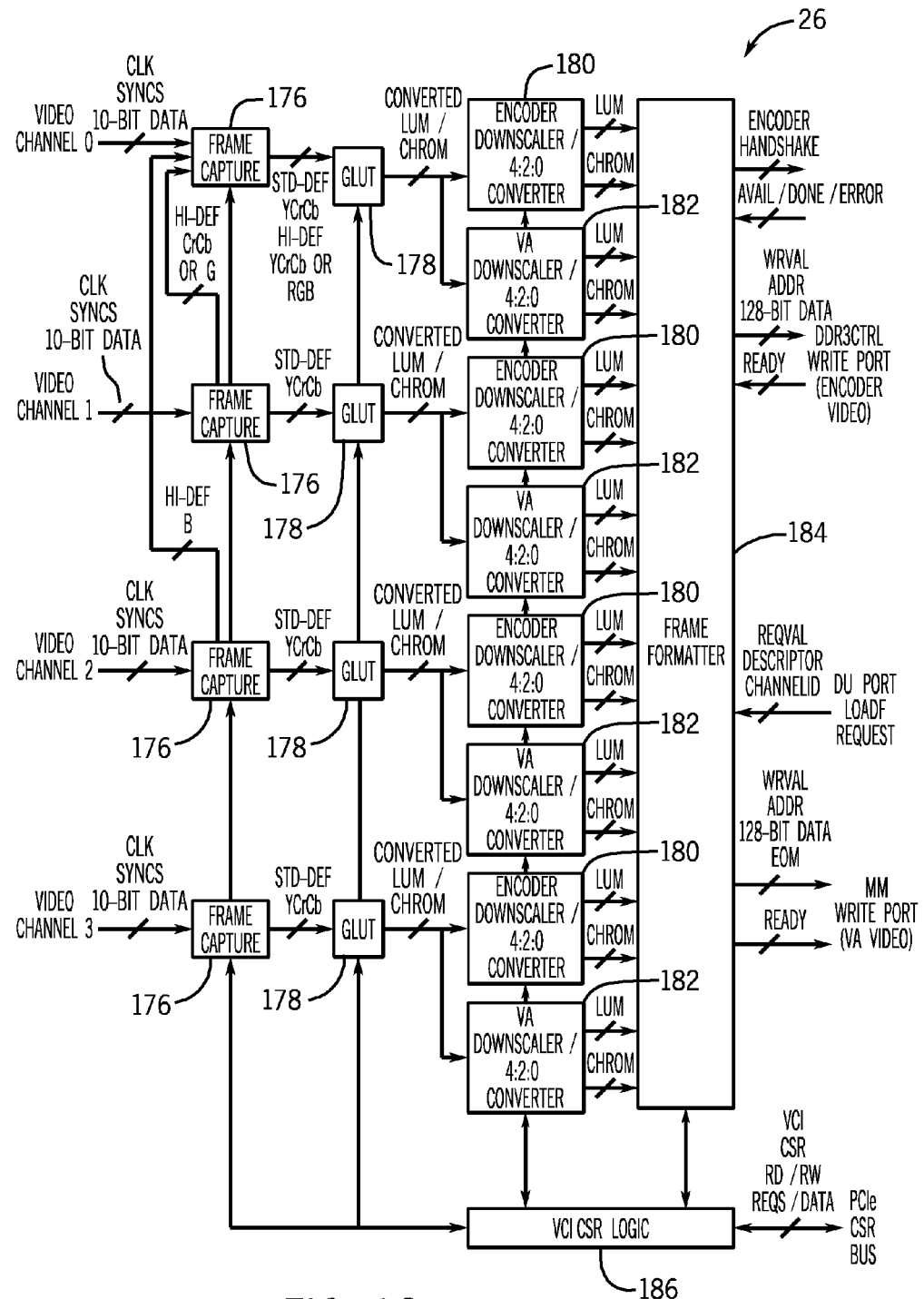
FIG. 10 is a schematic depiction of a video capture interface for one embodiment.

Referring to FIG. 10, a video capture interface 26, according to one embodiment, is capable of capturing high definition resolution or multiple standard definition video channels for real time video analytics. The interface may be configured to support one high definition resolution video channel or four standard definition video channels in one embodiment. It may support any video interface standard including International Telecommunication Union (ITU)-Recommendations BT.656 (12/07) and BT.1120 and Society of Motion Picture and Television Engineers (SMPTE) 274M-2005/296M-2001.

In one embodiment the video pipeline does not impose any restriction on the video dimensions in the vertical direction. Although the horizontal dimensions are constrained by the available line buffer size, removing the vertical restriction can enable several use cases.

In one embodiment, the interface 26 can continue functioning even when a video cable is physically disconnected. In addition, this interface can continue functioning in some embodiments even when frames have to be dropped due to resource conflicts in memory subsystems or on the PCI interface 36 (FIG. 2). In one embodiment a gamma correction function may be implemented using a look-up table approach. Such an approach allows firmware greater flexibility in choosing a curve for pixel translation.

A second windowing function may be provided on each of the encoding and analytics paths in one embodiment. This may enable independent setting of video size for encoding and analytics functions. Firmware may be changed on the fly. Internally, configuration changes are synchronized to the frame boundary which allows seamless interfacing with the rest of the integrated circuit in some embodiments.

In one embodiment, an internal one hundred megaHertz clock is able to work with input video channels at 27 megaHertz to 74.25 megaHertz. In addition, the core processor may operate at 300 megaHertz to 500 megaHertz in one embodiment.

Referring to FIG. 10, there are four input video channels labeled zero through three. High definition video can be provided on any two or three of channels zero through two and when high definition video is provided on channels one and two in one embodiment, it can be ported to the frame capture 176 associated with a video channel zero. Generally video channels one through three may handle standard definition video in all cases except the case when high definition video is received.

The frame capture units 176 provide either high definition or standard definition video to a gamma look-up table (GLUT) 178. The gamma look-up table converts input standard definition YCrCb or high definition YCrCb or RGB video spaces to luminance and chrominance values which are provided to downscalers 180 or 182. The downscalers 180 are associated with the encoder and the downscalers 182 are associated with the video analytics engine.

The downscalers provide downscaled luminance and chrominance data to a frame formatter 184. The frame formatter 184 then provides the various output signals including an encoder handshake signal, an available/done/error signal, and a write value address data signal that goes to the external memory's write port, and a write value address that goes to the memory matrix. In addition, the frame formatter 184 receives a ready signal from the encoder, and port load request from the dispatch unit 34 (FIG. 2).

A video capturing interface Control and Status Register (CSR) logic 186 interfaces with the frame capture, gamma look-up tables, downscalers and frame formatter and provides bidirectional access to the PCI Express bus 36 (FIG. 2) in some embodiments.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   determining whether video is in a first resolution or second resolution wherein said second resolution is a lower resolution than said first resolution;
   if the video is in the second resolution, reading the same rows in successive banks of memory; and
   if the video is in the first resolution, reading successive rows in the same bank of memory.

2. The method of claim 1, including transferring the video data between internal and external memory.

3. The method of claim 2, including transferring the video data from internal to external memory by reading data in two dimensional format and converting the data to one dimensional format.

4. The method of claim 2, including transferring the video data from external to internal memory by reading data in one dimensional format and converting to two dimensional format.

5. The method of claim 1, including providing four input video channels.

6. The method of claim 5, including receiving the first resolution video over two or three of said four input channels.

7. The method of claim 5, including receiving the second resolution video over any one of said four input channels.

8. The method of claim 5, including providing ping and pong buffers for each channel of said four input channels.

9. The medium of claim 8, including allocating three buffers for each video frame, one for each of luma and two chroma or Red, Green and Blue.

10. The method of claim 5, including filtering a luma component and two chroma components simultaneously.

11. A non-transitory computer readable medium storing instructions to perform a method comprising:
    determining whether video is in a first resolution or second resolution wherein said second resolution is a lower resolution than said first resolution;
    if the video is in the second resolution, reading portions of the video by reading the same rows in successive banks of memory; and
    if the video is in the first resolution, reading portions of the video by reading successive rows in the same bank of memory.

12. The medium of claim 11, further storing instructions to perform the method including transferring the video data between internal and external memory.

13. The medium of claim 12, further storing instructions to perform the method including transferring the video data from internal to external memory by reading data in two dimensional format and converting the data to one dimensional format.

14. The medium of claim 12, further storing instructions to perform the method including transferring the video data from external to internal memory by reading data in one dimensional format and converting to two dimensional format.

15. The medium of claim 11, further storing instructions to perform the method including providing four input video channels.

16. The medium of claim 15, including receiving the first resolution video over two or three of said four input channels.

17. The medium of claim 15, further storing instructions to perform the method including receiving the second resolution video over any one of said four input channels.

18. The medium of claim 15, further storing instructions to perform the method including providing ping and pong buffers for each channel of said four input channels.

19. The medium of claim 18, further storing instructions to perform the method including allocating three buffers for each video frame, one for each of luma and two chroma or Red, Green and Blue.

20. The medium of claim 15, further storing instructions to perform the method including filtering a luma component and two chroma components simultaneously.

21. An apparatus comprising:
    a memory; and
    a state machine to determine whether video in said memory is in a first resolution or second resolution wherein said second resolution is a lower resolution than said first resolution, if the video is in the second resolution, read portions of the video by reading the same rows in successive banks of the memory and if the video is in the first resolution, read portions of the video by reading successive rows in the same bank of memory.

22. The apparatus of claim 21, including internal and external memory, said machine to transfer the video data between said memories.

23. The apparatus of claim 22, said state machine to transfer the video data from internal to external memory by reading data in two dimensional format and converting the data to one dimensional format.

24. The apparatus of claim 22, said state machine to transfer the video data from external to internal memory by reading data in one dimensional format and converting to two dimensional format.

25. The apparatus of claim 21, said state machine to provide four input video channels.

26. The apparatus of claim 25, including an interface to receive the first resolution video over two or three of said four input channels.

27. The apparatus of claim 25, including an interface to receive the second resolution video over any one of said four input channels.

28. The apparatus of claim 25, including ping and pong buffers for each channel of said four input channels.

29. The apparatus of claim 28, including three buffers for each video frame, one for each of luma and two chroma or Red, Green and Blue.

30. The apparatus of claim 25, including logic to filter a luma component and two chroma components simultaneously.

* * * * *